United States Patent
Balarajashetty

(10) Patent No.: US 11,152,810 B2
(45) Date of Patent: Oct. 19, 2021

(54) RULE BASED SMART CHARGING

(71) Applicant: Sling Media Pvt. Ltd., Bangalore (IN)

(72) Inventor: Vikram Balarajashetty, Bangalore (IN)

(73) Assignee: SLING MEDIA PVT. LTD., Karnataka (IN)

( * ) Notice: Subject to any disclaimer, the term of this patent is extended or adjusted under 35 U.S.C. 154(b) by 171 days.

(21) Appl. No.: 15/985,395

(22) Filed: May 21, 2018

(65) Prior Publication Data

US 2019/0356137 A1 Nov. 21, 2019

(51) Int. Cl.
*H02J 7/00* (2006.01)
*H01M 10/42* (2006.01)

(52) U.S. Cl.
CPC ............ *H02J 7/008* (2013.01); *H02J 7/0027* (2013.01); *H02J 7/00036* (2020.01); *H01M 10/4257* (2013.01)

(58) Field of Classification Search
CPC ....... H02J 7/008; H02J 7/00036; H02J 7/0027
See application file for complete search history.

(56) References Cited

U.S. PATENT DOCUMENTS

| | | | |
|---|---|---|---|
| 8,655,307 B1 | 2/2014 | Walker et al. | |
| 9,681,213 B2* | 6/2017 | Siotis | H04R 1/1083 |
| 10,263,449 B2* | 4/2019 | MacDonald | H04R 27/00 |
| 2012/0324578 A1 | 12/2012 | Seinfeld et al. | |
| 2013/0238540 A1 | 9/2013 | O'Donoghue et al. | |
| 2013/0314054 A1 | 11/2013 | Bergqvist et al. | |
| 2015/0123595 A1* | 5/2015 | Hussain | H02J 7/00 320/107 |
| 2015/0341716 A1* | 11/2015 | Desmarais | H02J 7/00 381/150 |
| 2016/0248266 A1* | 8/2016 | Ferrese | H02J 7/0003 |

OTHER PUBLICATIONS

International Search Report and Written Opinion for PCT application No. PCT/IB2019/054135 dated Sep. 23, 2019, 14 pages.

* cited by examiner

*Primary Examiner* — Richard V Muralidar
(74) *Attorney, Agent, or Firm* — Seed IP Law Group LLP

(57) ABSTRACT

Smart battery charging solutions are disclosed. The smart charging solutions of the disclosure enable a user to configure a mobile device with individualized battery charging settings. The user specific settings may be combined with system settings to generate rules on battery charging. Context awareness is achieved through various sensors and through information sharing within and among the systems of the mobile device. The battery charging rules and the context awareness information are used together in controlling the charging of a battery.

20 Claims, 3 Drawing Sheets

RULE BASED SMART CHARGING

BACKGROUND

Technical Field

The present disclosure relates generally to battery charging management of a device, and more specifically to dynamic and programmable battery charging control.

Description of the Related Art

Currently, mobile devices and wearable electronic devices are equipped with powerful processors capable of performing complex computation locally or remotely in coordination with a cloud based server. A vast number of mobile applications are generated and installed in mobile devices. Many of the mobile applications include background operations that consume power even if the mobile applications are not actively used by a user. Battery capacity thus becomes a major constraint of the user experience on mobile devices.

Fast battery charging capacity thus becomes a desirable feature for mobile devices. However, a fast charging operation involves higher charging current which has negative impact on the life of the battery.

BRIEF SUMMARY

The present disclosure is directed to a technique for smart selection of battery charging schedules based on rules and detected contextual scenarios of the battery charging.

Battery capacity is a major constraint on the performance of a mobile device. Due to the size limitation of the mobile device and the increased number of embedded functions and components, the battery charge is consumed increasingly fast. Fast charging capacity is preferred, which comes at a cost of the long term battery life. The smart charging solutions of this disclosure enable a user to configure the mobile device with individualized battery charging settings. The user specific settings may be combined with dynamic system settings to generate rules based on the battery charging. Once the system is aware of the current context of the phone, the battery charging is modified based on that context.

Context awareness is achieved through various sensors and through information sharing within and among the systems of the mobile device. For example, the saved calendar of a user, through a calendar application on the mobile device, may be shared with a battery charging control unit. An operation status of the mobile device, e.g., an on-going multi-media content playback, may also be shared with the battery charging control unit. A location of the mobile device, detected through GPS or indoor positioning RF sensors, may be received by the battery charging control unit. All such contextual scenarios related to the battery use and battery charging operations will be analyzed with the rules to determining a charging schedule, i.e., a choice between/among various charging schemes. The charging schemes may include fast charging versus normal charging, 100% charging versus 75% percent charging, timing of the charging and other factors. The resultant charging schedule will maintain a balance between user experience and battery economy. And the user experience is enhanced in a manner that fits the contextual scenarios. The memory will store the charging times and patterns for all past charges. Over time, a charge history is built; the batter charging control unit will use the charge history to estimate future charge timing and other factors associated with a charge. It can then control a current charge to be performed based on the factors from the charge history.

The disclosed techniques bring about technical and commercial advantages to the whole ecosystem centered on the mobile devices and connected devices. For example, device manufacturers do not need to equip the devices with unnecessarily high capacity batteries to compensate for the detrimental impacts of fast charging. Application developers do not need to automatically downgrade the performance of the application programs to be in line with decreased battery capacity as the devices age.

BRIEF DESCRIPTION OF THE SEVERAL VIEWS OF THE DRAWINGS

The present disclosure will be more fully understood by reference to the following figures, which are for illustrative purposes only. The figures are not necessarily drawn to scale, and elements of similar structures or functions are generally represented by like reference numerals for illustrative purposes throughout the figures. The figures do not describe every aspect of the teachings disclosed herein, and do not limit the scope of the claims.

DETAILED DESCRIPTION

Figure 1:
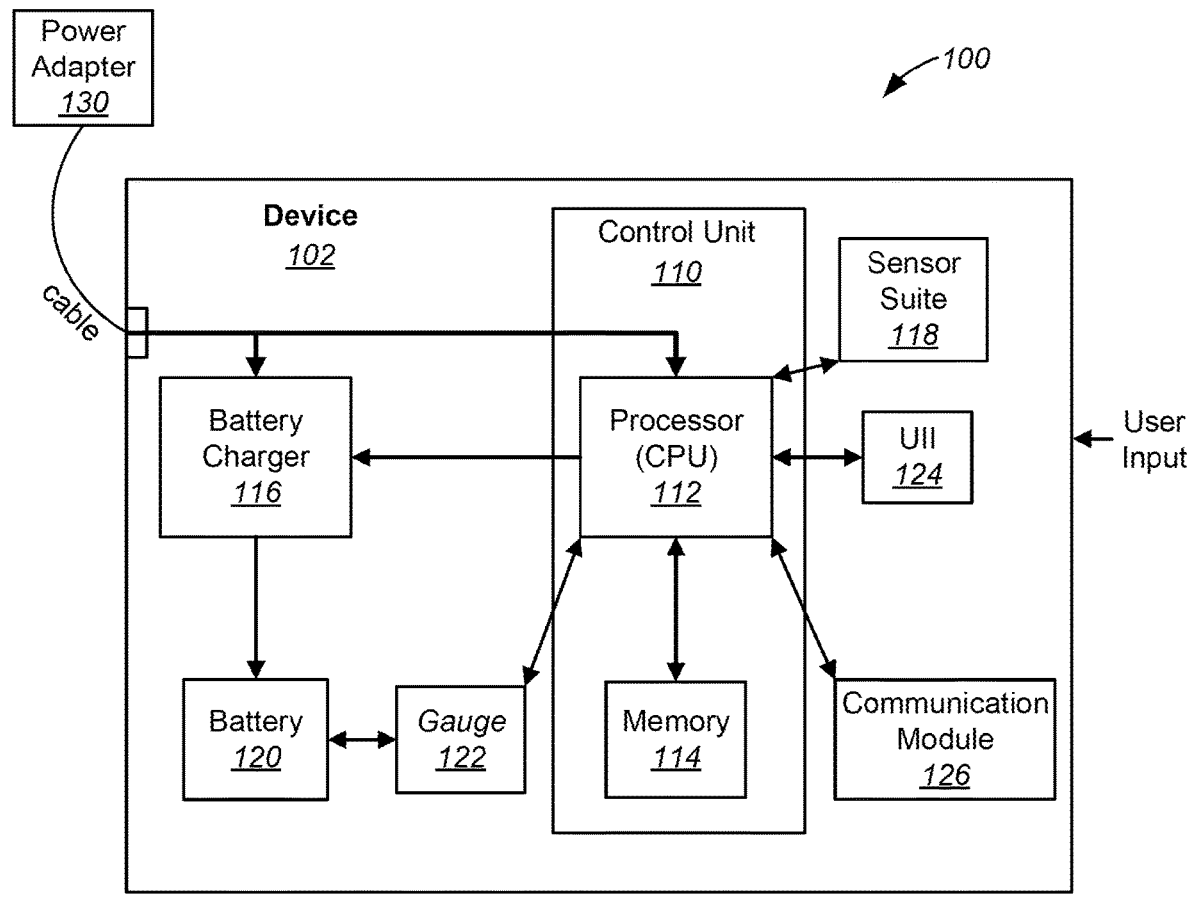
FIG. 1 is a block diagram of an example system of smart charging according to the disclosure.

Each of the features and teachings disclosed herein may be utilized separately or in conjunction with other features and disclosure to provide a system and method for achieving smart battery charging based on context awareness and user settings. Representative examples utilizing many of these additional features and teachings, both separately and in combination, are described in further detail with reference to the attached FIGS. 1-3. This detailed description is intended to teach a person of skill in the art further details for practicing aspects of the present disclosure, and is not intended to limit the scope of the claims. Therefore, combinations of features disclosed above in the detailed description may not be necessary to practice the teachings in the broadest sense, and are instead disclosed merely to describe particularly representative examples of the present disclosure.

In the description below, for purposes of explanation only, specific nomenclature is set forth to provide a thorough understanding of the system and method for achieving context awareness by the smart device or smart system. However, it will be apparent to one skilled in the art that these specific details are not required to practice the teachings of the current disclosure. Also, other methods and systems may also be used.

Nowadays many smart devices, e.g., smart phones, wearable device, and connected home terminals, come with fast charging technology which permits a user to charge the batteries in as short as a few minutes. However, such fast charging capacity causes negative impacts on long term battery life. If the battery is repeated subject to test charging, it may last only a few months before it needs to be replaced because it can no longer hold a charge for long periods of time. Fast charging may also have negative effects on other sensitive electronic components of the smart devices. For example, the heating effects of fast charging may affect the operation of CMOS transistors in the digital circuitry of the application processors, connectivity ICs and/or wireless modem ICs.

Research has shown that the increased charge current, a common approach of fast charging, will reduce the discharging capacity of Li-ion batteries over a short period of time, e.g., after a few charging and discharging cycles. On the other hand, users may not need fast charging in all scenarios. For example, when a user charges her mobile phone overnight, she does not need fast charging and a slow charge lasting 6 hours is acceptable.

The disclosed techniques provide smart battery charging solutions through a rule based charging schedule, which selects between or among fast charging, normal charging, and slow charging, based on one or more of device configuration and context awareness. For an embodiment, the solution enables a user to pre-set the charging configurations or settings, e.g., fast charging or normal charging, for a given day/time of a week. For an illustrative example, the user may set that a fast charging option is applied during the middle of a work day, a normal charging option is applied for weekend, and a slow charge is used for the night. Also, in device configuration and/or settings, a user may set the charging time to complete a 100% charging in 1 hour, 4 hours, or 6 hours. In addition, the device may automatically choose the suitable charging current/charging speed to achieve the preset charging time. A device configuration may also provide that the battery be charged to 80% full as a default economic setting and to 100% full only in identified scenarios. The charging schedule may be linked to the day/time in the charge settings. A user may choose 1 hour charging for weekday daytime charging and may choose 6 hour charging for workday nighttime charging. Such user settings may be stored in a memory and retrieved each time a charging operation is detected, either by the device being plugged in to a power source or by other suitable charging events, like wireless charging.

In addition, charging the batter to only 80% or 90% full will extend long term batter life. If the batter is charged to the full 100% capacity every time, this will reduce the battery life. If the charge and battery use history indicates that on weekdays the batter will only be 20% depleted before it is charged the next time, the program can elect to charge the battery to 80% on weekdays. But, if the batter is frequently fully depleted on weekends, and is only charged after the battery is fully used, then on the day before the weekend and on a weekend, it can charge to the full 100% capacity. Then, on the next week day, it can revert to charging to only 80% of capacity. A user interface is enabled for a user to set up the charging configuration or to update the charging configuration. The user interface may also be used for the user to dictate a one-time charging schedule to override the preset charging configurations.

In addition to preset charging configurations, the user may be prompted to select fast charge, normal charge or existing settings (preset configurations) to meet the dynamic needs of the user. For example the user is on vacation and planning a night travel, he may need quick charge of the battery.

Alternatively and additionally, a battery charging control unit may automatically determine a charging schedule based on a context of the charging. The context may include, but not limited to, a current activity of the user, a location of the device being charged, a day/time of the charging, a social environment of the charging, an operation status of the device, and/or a condition of the battery. Such context information may be obtained determinatively through an embedded clock of the device, a stored calendar of the user, etc. The context information may also be detected through various sensors enclosed in the mobile device. For example, an acoustic sensor may detect voice information of the user related to the battery charging. A motion sensor may detect a physical motion activity of the user holding the device. A GPS sensor may determine an outdoor/geographic location of a device to be charged. A RF sensor or a mobile signal strength sensor may be used to determine an indoor location of a device to be charged. Further the battery charging control unit may also be trained using historical battery charging settings and user's selections to customize the automatic selection of the charging schedule.

A user may also set up rules regarding how the context information be applied in the charging schedule selection. For example, a user may preset the device that a charging at his work space (a location context) be under the fast charging method. A user may also preset the device that a charging through a USB socket of a car be under the fast charging method.

For example, a user goes to office from Monday to Friday and she charges her phone in the nighttime of these days. Here, she does not require any fast charging. So during these days between 9 PM to 5 AM, she sets the battery charge time to 6 hours. During all time in weekend and during weekdays (MON-FRI) between 5 AM-9 PM, she sets the battery charge time to 1 hour. Further, each time the phone is connected to charging, e.g., plugged-in or connected through wireless charging, a pop-up may be activated asking the user to select among charge time options to override the preset charging settings or the default options. In an embodiment, a fast charging option may be the default setting to maintain better user experience.

The techniques increase battery life without compromising user experience by smartly choosing the fast charging only when it is needed. As such, it can save cost for phone manufacturers because phone manufacturers do not need to spend extra resources on high capacity batteries to survive unnecessary fast charging and the resulted detrimental impacts.

FIG. 1 shows an example system 100 of smart charging. Referring to FIG. 1, system 100 includes a device 102 having a smart charging features enabled by a charging control unit 110, a battery charger 116 and a sensor suite 118. The control unit 110 includes a processor 112, e.g., a central processing unit (CPU), an application processor (AP), and/ or a microcontroller (MCU), and a memory 114. The sensor suite 118 may include various sensors for detecting various context information of the device 102. The various sensors may include, but are not limited to, a ranging sensor, a satellite based positioning sensor (e.g., a GPS sensor), an environmental sensor (e.g., a gas sensor and/or a humidity sensor), one or more motion sensors (e.g., an accelerometer and a gyroscope), a barometer, a magnetometer, a microphone and other sensors. The various context data may include at least one of motion, sound and location related to the device 102.

The battery charger 116 is coupled to a battery 120 to charge battery 120 based on a charging schedule from the control unit 110. A gauge 122 is coupled to the battery 120 to detect a condition of the battery 120, e.g., the remaining charges of the battery 122. The gauge 122 may be implemented through any circuity solutions and all are included in the disclosure. For example, the gauge 122 may be a series resistance meter (ESR meter) configured to measure the internal resistance of the battery 120 to determine the remaining charges thereof. In an embodiment, the gauge 122 is part of the sensor suite 118 and is shown separately in FIG. 1 for illustrative purposes only.

A user interaction interface (UII) 124 is included in the device 102 and coupled to the processor 112. The UII 124 may be configured to receive a user input in configuring the smart charging operations of the control unit 110. The UII 124 may be linked to and/or function with a keyboard, a mouse, a touch screen, a gesture recognition device, a voice command device and/or other devices for user interactions.

A communication module 126 is included. The communication module may be configured for a user to remotely configure the control unit 110 in implementing the smart charging of the battery 120.

A power supply 130 is illustratively shown as a physical means for a connection to a power source for charging the battery. This can be a standard wall plug with an AC to DC converter. Other means for connection to an electrical source are also possible and as examples a USB enabled power connection, a Display Port standard enabled power connection, a wireless charging, a charging pad, and other suitable power connection for battery charging.

In operation, the control unit 110 detects a battery charging condition, e.g., that the device 102 is coupled to a power source. The gauge 122 detects a charge condition of the battery 120, e.g., whether the battery 120 is full of charge, partially full of charge, low on charge, etc. The gauge 122 may also detect a charging related characteristic of the battery 120, e.g., whether the battery 120 is in a suitable condition to sustain high current fast charging. For example, as the battery ages, it may not be at a same condition as a new battery and its capacity to receive high charging current may be compromised. The gauge 122 may detect the charging conditions of the battery 120 and output the detected information to the processor 112 of the control unit 110.

The sensors in the sensor suite 118 may detect a contextual scenario of the battery charging operation. The context may include a location of the battery charging, an activity of the user of the device 102 at the time of the battery charging, a day/time of the battery charging, and other context information related to the battery charging.

The processor 112 may retrieve the battery charging settings or configurations set by the user and/or by the control unit 110 as an autonomous system function and determine the battery charging rules based thereupon. The determined rules will be applied to the detected battery charging context received from the sensor suite 118 and the detected charge conditions of the battery 120 received from the gauge 122 to determine a battery charging schedule, e.g., fast charging, normal charging, 100% charging, 75% charging, etc., and/or various combinations thereof.

The processor 112 may output a control signal representing the determined charging schedule to the battery charger 116 for the battery charger 116 to implement the charging schedule in controlling the charging of the battery 120.

FIG. 1 shows that the control units 110, the sensor suite 118 and the battery charger 116 are all included in the device 102 where the battery 120 belongs to. This is not limiting. One or more of the control units 110, the sensor suite 118 and the battery charger 116 may reside in a separate device than the device 102 and may function together with the device 102 in the smart charging of the battery 120.

In an embodiment, the processor 112 executes executable instructions that are stored on the memory 114 in the smart charging operation.

Figure 2:
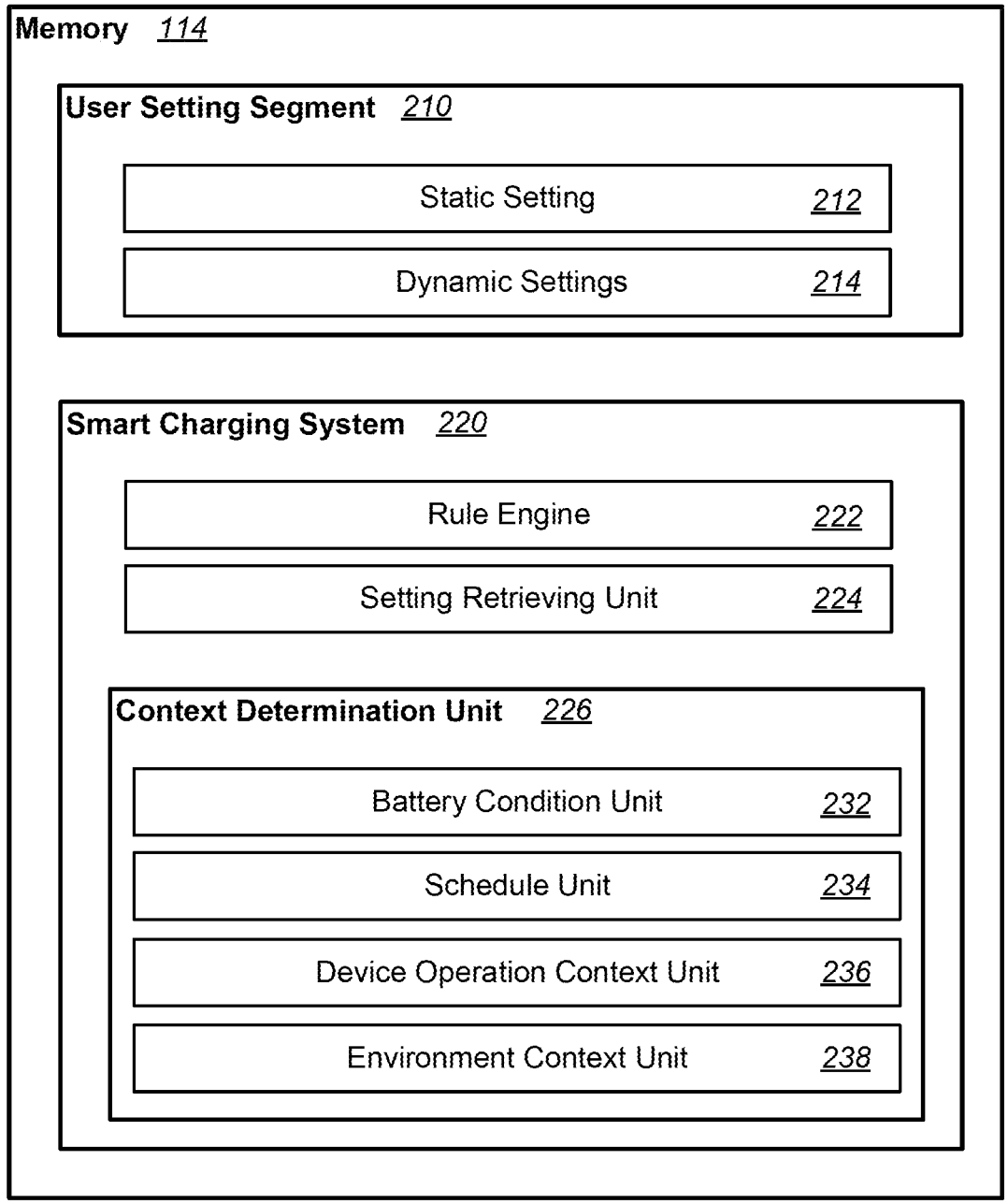
FIG. 2 illustrates examples of program features stored in the memory of a control unit according to the disclosure.

FIG. 2 shows an example embodiment of the memory 114. Referring to FIG. 2, the memory 114 includes a user setting segment 210 and a smart charging system 220. The user setting segment 210 includes static settings 212 and dynamic settings 214. Static settings 212 provide a battery charging configuration that is not dependent upon a context of the charging or is dependent only upon a determinative context, like day/time. For example, a user may set a static setting that the device 102 is charged under the fast charging schedule during daytime hours from Monday to Friday.

A dynamic setting 214 provides how the control unit 110 responds to a dynamically determined context ("dynamic context") in the selection of the charging schedules. For example, a user may set a dynamic setting that the device 102 is charged under the fast charging method if an outside meeting is scheduled within 1 hour. A user may also set a dynamic setting that the device 102 is charged under the normal charging schedule if the battery is charged in his office through the USB port of his laptop computer.

The smart charging system 220 includes a rule engine 222, a setting retrieving unit 224, and a context determination unit 226. The rule engine 222 is configured to determine a battery charging rule based on the user settings, the system settings and the context information related to the battery charging. The pieces of context information, system settings and/or user settings may be leading to contradicting options in the charging schedules and the rule engine 222 may include a conflict resolution unit to handle such conflicts. For example, the conflict resolution unit may stipulate that a static setting has a priority over a dynamic setting and the related context. The conflict resolution unit may also provide that the fast charging method has a priority over the normal charging method in case of conflict such that a better user experience is ensured. The rule engine 222 may also include a training unit that trains the rule engine 222 on the rule selections including the conflict resolution. For example, historical user inputs on battery charging settings, e.g., the one-time charging schedule, may be correlated with the respective context information and be used to train the rule engine 222 on the user's personal preferences in those contextual scenarios.

The memory 114 can, in one embodiment, store the historical record of the charging of the battery and also the depletion of the battery following each charge. This would include storing, in some embodiments, the amount of time between each charge, the use of the phone during that time period, and the rate at which the battery was discharged. The historical charging and discharging sequences in time provide a battery usage history. For example, one particular user might make little to no use of the cell phone on the weekends and after this pattern has been established the rule engine 222 can set the rules to charge the battery to only 50% for a weekend. Similarly, if a user has a history of charging the battery every single night without any misses and depletes only 10% or 15% of the battery each day before it is charged again all night then, in order to extend the battery life by repeatedly to always 100% the rule engine 222 can determine to charge the battery to approximately 60% or 70% each night rather than the full 100% which will extend the lifetime of the battery without impacting the use. As another example, a different user might watch numerous videos or play video games on weekends, long airline flights, or at other times. As this history is collected, the timing including days of the week, dates, as well as the time of day, that heavy power consumption is needed of battery can be tracked and stored in the memory 114. Then, using this historical record as a prediction for the future the rule engine 222 will charge the battery to 100%, even to top it off at the highest level when it is plugged in prior to an expected use that will likely deplete the battery. These examples are provided as a dynamic context in which the rule engine 222 will vary the charging of the battery at different times to provide adequate power for the user but only partially charge the battery whenever practical without impacting future use by the user. By charging the battery to 100% only in those times that it is anticipated that the user will likely use at least 80% of the battery power, the number of times that it is charged to the full 100% capability is reduced and, therefore, the life of the battery is extended.

In one preferred embodiment of a dynamic context, the rule engine 222 will use the historical battery usage pattern to determine expected use for a current charge. The rule engine 222 will thereafter control the smart charging system 220 to charge the battery to an overage of some set amount such as 15%, 20%, or 25% beyond the expected maximum power that the user is likely to need before the next charge. For example, if a user has a long history of using only 50% of the batter between each charge and reliably plugs the phone in at least once every 24 hours for charging, then the rule engine 222 can charge the battery to a selected threshold above the expected use. For example, if the use is approximately 50% of the battery then the rule engine 222 can charge the battery to 70% or 75% each time so that an overage is provided as additional backup power in the event more is used in any one particular setting. The overage of charging can be selected by the user in some embodiment, for example, the user can select it to charge an overage of 10% from the expected use, 15%, 20%, 25%, or some amount based on the margin of safety of battery power which they wish to program, knowing that by setting the rule engine 222 to charge the phone to some percentage lower than 90% they are greatly extending their battery life for several months, perhaps several years of additional use without the need to obtain a new battery.

The setting retrieving unit 224 is configured to retrieve system settings and/or user settings from the setting segment 210. In the retrieving, the setting retrieving unit 224 may determine the pertinent settings and/or the most updated settings relevant to the determined charging context, either determinative context or dynamic context.

The context determination unit 226 is configured to determine a context of the battery charging operation. A context may be a determinative context, i.e., a context that is determinatively determined and/or readily available, like day/time of battery charging, or may be a dynamic context. A dynamic context is determined based on the readings of the sensors in the sensor suite 118. The readings of multiple sensors may be analyzed together in the determination of the dynamic context. As such, the context determination unit 226 includes memory and programs to consolidate readings of multiple sensors in the determination of the context. In an embodiment, the memory and programs include designated modules specifically tailored for the determination of classified contextual scenarios. The classified contextual scenarios correspond to user static settings 212, user dynamic settings 214, and/or rules in the rule engine 222.

Specifically, in an embodiment, the memory and programs include a battery condition unit 232, a schedule unit 234, a device operation context unit 236 and an environment context unit 238. The battery condition unit 232 is configured to determine a condition of the battery 120 relevant to the charging, based on the readings of gauge 122 and other sensors detecting electrical and chemical parameters and characteristics of the battery 120. The battery 120 condition includes the remaining charges of the battery and a capacity of the battery 120 to receive charging under various charging methods.

The schedule unit 234 is configured to determine a schedule of the user of the device 102 such that the charging of the battery 120 could be conducted to fit the schedule of the user. The schedule unit 234 may obtain the user's schedule through a saved calendar of the user through a calendar application of the device 102. The schedule unit 234 may also use readings of the sensors in the sensor suite 118 to determine a schedule of the user. For example, a microphone sensor in the sensor suite 118 may detect a voice conversation of the user stating that the user is leaving for a meeting in 30 minutes. Such voice recognition readings may be used by the schedule unit 234 to determine an updated schedule of the user. In an embodiment, a stored schedule key word may be used in the voice recognition. The key words may include "meeting", "leaving", "lunch", "silent," or other suitable key words. Further, a GPS reading of a geographic location of the device 102 may also be used to determine a charging schedule of the user. If at 11 AM on a workday, the GPS sensor determines that the device 102 is on a street outside the office of the user, the schedule unit 234 may use this piece of information, along with other context information, to determine that the user is going to a meeting away from her work place.

The device operation context unit 236 is configured to determine an operation status of the device 102 at the time of the battery charging. The device operation context unit 236 may obtain the device 102 operation status through the process registration of the application processor/processor cores or through other suitable approaches. The operation status of the device 102 provides pertinent context in determining the battery charging schedules. For example, if the device 102 is determined as playing a multi-media content at the time of battery charging, a fast charging method may be chosen because the multi-media content playback operation consumes battery quickly.

The environment context unit 238 is configured to determine an environment background of the battery charging. An environment background may include a location, either an outdoor location or an indoor location. An environment background may also include an activity of the user of the device 102. An activity of the user may be a social activity like a conversation of the user or a motion activity like riding in a vehicle.

It should be appreciated that the various fusion units of the context determination unit 226 may analyze the readings of the same or different sensors or other resources. The findings of the various fusion units may be further used in the analysis of the same fusion unit or other fusion units.

Figure 3:
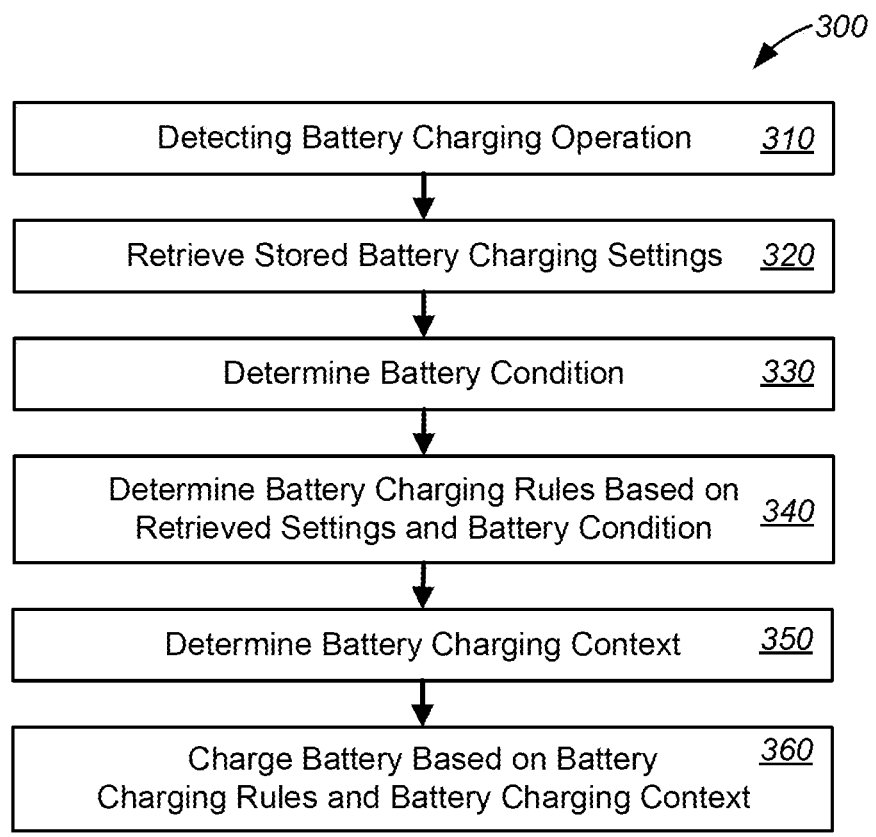
FIG. 3 illustrates a flow chart of an operation process according to the disclosure.

FIG. 3 shows an example operation process 300 of the system 100 of FIG. 1. Referring to FIG. 3, in example operation 310, the control unit 110 detects a battery charging operation. For example, the control unit 110 may detect that the device 102 is plugged into a power source through the power adapter 130.

In example operation 320, the setting retrieving unit 224 retrieves the stored battery charging settings. The battery charging settings include the static settings 212 and/or the dynamic settings 214.

In example operation 330, the gauge 122 and/or other sensors in the sensor suite 118 determine a condition of the battery 120 in relation to the battery charging operation. The battery 120 condition may include remaining charges of the battery 120 and a capacity of the battery 120 to sustain various types of charging.

In example operation 340, the rule engine 222 determines a battery charging rule based on the retrieved settings and the battery condition. The battery condition may be considered as a restrictive factor in the smart charging. That is, an imperfect condition of the battery 120 may restrict the choices of the battery charging schedules otherwise available. The remaining charges of the battery 120 may not be used in the rule determination and may be used as a context of the battery charging. In an embodiment, the rule determination may be done prior to or separately from the determination of the context scenarios. In another embodiment, the rule determination is done based on the detected contextual scenarios of the battery charging. All such variants are possible and included in this disclosure.

In example operation 350, the context determination unit 226 determines the context information related to the battery charging operation. Specifically, the program of the context determination unit 226 may determine one or more of a condition of the battery 120, a schedule of the user of the device 102, an operation status of the device 102, and/or an environment background of the battery charging. The environment background of the battery charging may include a location of the device 102, a social activity and/or a physical activity of the user of the device 102.

In example operation 360, the control unit 110 applies the determined battery charging rules into the determined battery charging context to determine a battery charging schedule and outputs a control signal representing the battery charging schedule to the battery charger 116 to implement the charging accordingly.

These and other changes may be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents In general, in the following claims, the terms used should not be construed to limit the claims to the specific embodiments disclosed in the specification and the claims, but should be construed to include all possible embodiments along with the full scope of equivalents to which such claims are entitled. Accordingly, the breadth and scope of a disclosed embodiment should not be limited by any of the above-described exemplary embodiments, but should be defined only in accordance with the following claims and their equivalents.

Processors, as described herein, include central processing units (CPU's), microprocessors, microcontrollers (MCU), digital signal processors (DSP), application specific integrated circuits (ASIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processor may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

As known by one skilled in the art, a computing device has one or more memories, and each memory may comprise any combination of volatile and non-volatile computer-readable media for reading and writing. Volatile computer-readable media includes, for example, random access memory (RAM). Non-volatile computer-readable media includes, for example, any one or more of read only memory (ROM), magnetic media such as a hard-disk, an optical disk drive, a flash memory device, a CD-ROM, and the like. In some cases, a particular memory is separated virtually or physically into separate areas, such as a first memory, a second memory, a third memory, etc. In these cases, it is understood that the different divisions of memory may be in different devices or embodied in a single memory.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

What is claimed is:

1. A system comprising:
a power charge circuit configured to implement a battery charging operation on a battery of a device;
one or more sensors configured to detect a context of the battery charging operation; and
a control unit configured to control the power charge circuit in the battery charging operation based on the detected context including an operation status of the device in a multimedia content playback operation;
wherein the control unit controls the power charge circuit to implement a fast charging mode in response to that the device is in the multimedia content playback operation.

2. The system of claim 1, wherein the control unit includes a storage medium containing executable instructions which, when executed by a control unit, configures the control unit to implement actions including:
retrieving a stored battery charging configuration setting,
determining a rule based on the retrieved battery charging configuration setting;
applying the rule to the detected context; and
outputting a control signal based on the application of the rule to the detected context.

3. The system of claim 1, wherein the one or more sensors include a sensor configured to determine an environmental context of the battery charging operation.

4. The system of claim 3, wherein the environmental context includes a location of the battery charging operation.

5. The system of claim 3, wherein the environmental context includes a motion activity related to the device.

6. The system of claim 1, wherein the one or more sensors include a sensor configured to determine a condition of the battery.

7. The system of claim 1, wherein the control unit is further configured to control the power management circuitry in the battery charging operation based on a determined schedule of a user of the device.

8. The system of claim 1, wherein the one or more sensors include a sensor configured to detect a voice; and,
the control unit is configured to analyze the voice to determine a schedule of a user of the device.

9. The system of claim 8, wherein the determining the schedule of the user based on the voice includes retrieving a stored schedule key word.

10. A mobile device, comprising:
a battery;
one or more sensors including an acoustic sensor configured to detect a context of charging the battery;
a battery charging circuitry;
a control unit configured to control the battery charging circuitry in charging the battery based on a battery charging rule, the control unit including a storage medium containing executable instructions which, when executed by a processor of the control unit, configures the processor to implement actions including:
receiving a battery charging configuration setting,
determining the battery charging rule based on the battery charging configuration setting;
receiving the context of charging the battery from the one or more sensors including the acoustic sensor;
outputting a control signal to the battery charging circuitry based on the battery charging rule and the context of charging the battery including the context received from the acoustic sensor.

11. The mobile device of claim 10, wherein the one or more sensors is configured to detect a location of the mobile device.

12. The mobile device of claim 10, wherein the one or more sensors is configured to detect a motion activity related to the mobile device.

13. The mobile device of claim 10, wherein the one or more sensors is configured to detect a condition of the battery.

14. The mobile device of claim 10, wherein the control signal is determined based on the battery charging rule and a piece of calendar information stored on the mobile device.

15. A method, comprising:
determining a battery charging operation of a mobile device including an acoustic sensor;
receiving a battery charging setting information;
detecting a context of the battery charging operation based on a reading of the acoustic sensor of the mobile device;
determining a battery charging schedule based on the battery charging setting and the context of the battery charging operation; and
controlling the battery charging operation by outputting a control signal based on the battery charging schedule.

16. The method of claim 15, wherein the context of the battery charging includes a schedule of a user of the mobile device about the battery charging operation.

17. The method of claim 15, wherein the context of the battery charging includes an activity of the user of the mobile device.

18. The system of claim 15, comprising activating an interaction means for a user of the mobile device to input the battery charging setting information.

19. The system of claim 1, wherein the one or more sensors include an acoustic sensor.

20. The mobile device of claim 10, wherein the acoustic sensor of the one or more sensors is configured to detect voice information of a user of the mobile device related to charging the battery.

\* \* \* \* \*